Nov. 21, 1933.  L. S. WITHERSPOON  1,935,969
CONTAINER
Filed Feb. 24, 1931   2 Sheets-Sheet 1
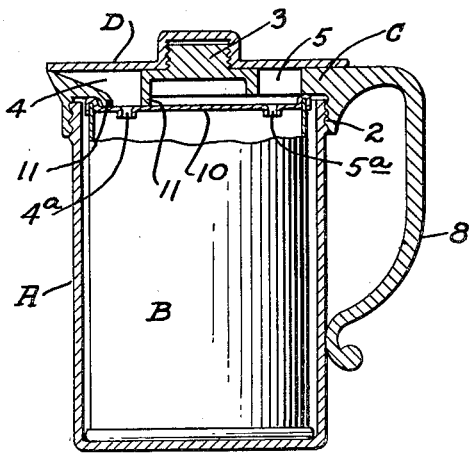
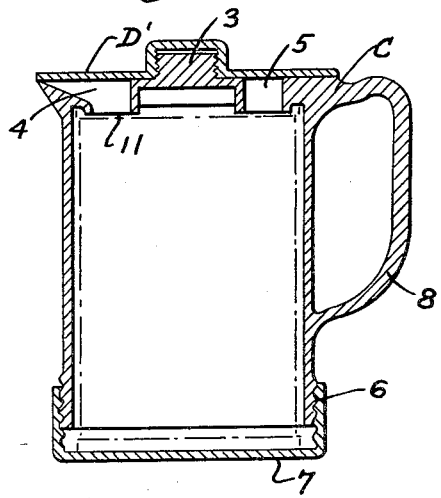
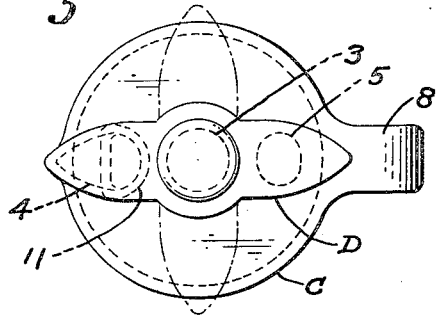
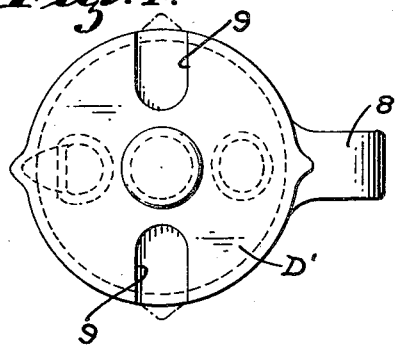
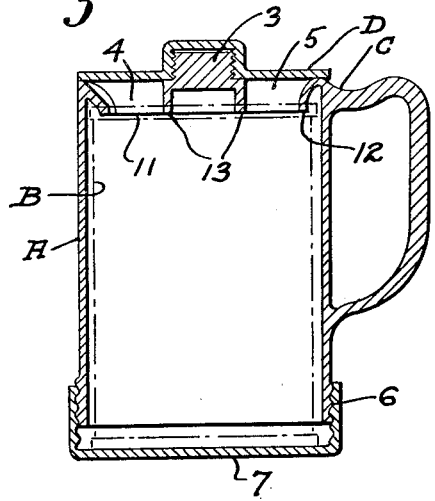
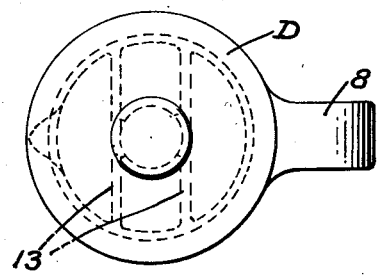
INVENTOR.
Lillian S. Witherspoon.
BY
Townsend, Loftus & Abbett
ATTORNEYS.

Nov. 21, 1933.   L. S. WITHERSPOON   1,935,969
CONTAINER
Filed Feb. 24, 1931   2 Sheets-Sheet 2

INVENTOR.
Lillian S. Witherspoon.
BY Townsend, Loftus & Abbett
ATTORNEYS.

Patented Nov. 21, 1933

1,935,969

UNITED STATES PATENT OFFICE 1,935,969

CONTAINER

Lillian S. Witherspoon, San Francisco, Calif.

Application February 24, 1931. Serial No. 517,894

3 Claims. (Cl. 65—61)

This invention relates to a container for cream, milk, and the like and especially to a container which is adapted for the reception of hermetically sealed cans containing condensed milk, etc., and for dispensing the contents thereof.

Condensed milk such as bought in hermetically sealed tin cans is used throughout the whole world in enormous quantities. Milk of this character has become a household necessity and is principally used as a substitute for cream in coffee, chocolate, and the like, and in diluted form for cooking. When used for coffee, or the like, the top of the can is usually punched in two places to form a vent and a pouring opening and it is then placed on the table where the different individuals may pour directly from the can into the coffee cup as required. A milk can when placed on the table is in the first place an unsightly article, plainly speaking, anything but ornamental; secondly, the contents will rapidly sour particularly during warm weather; and third, it is anything but sanitary as the content is exposed to dust and dirt and most serious of all to contamination of flies and other insects.

The object of the present invention is to provide a container for the reception of condensed milk cans and for dispensing the contents thereof; to provide a container which is ornamental when placed on the table or otherwise; to provide a container which is adapted to be substantially sealed when not in use so as to exclude air and thereby reduce the tendency of the milk to sour but principally to prevent contamination and entrance of dust and dirt; to provide a container which is adapted to snugly engage can tops of varying contour and shape; to provide a container in which milk cans can be readily and quickly inserted or removed; and, further, to provide a container which is simple in construction, which requires few parts, and which may be readily sterilized or cleaned from time to time.

The invention is shown by way of illustration in the accompanying drawings, in which—

Fig. 1 is a central, vertical section showing one form of container, the section showing a milk can inserted therein.

Fig. 2 is a plan view of Fig. 1 showing the secondary cover whereby the pouring and vent openings are sealed when the container is not in use.

Fig. 3 is a section similar to Fig. 1 showing a slight modification in construction.

Fig. 4 is a plan view of Fig. 3 showing a modified form of secondary cover.

Fig. 5 is a section similar to Fig. 1 showing another modification.

Fig. 6 is a plan view of Fig. 5.

Figure 7:
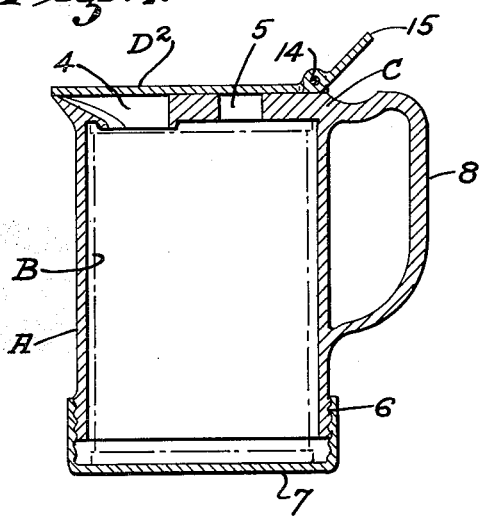
Fig. 7 is a section similar to Fig. 1 showing a modified form of secondary cover.

Referring to the drawings in detail and particularly Fig. 1, A indicates a container adapted to receive and enclose a milk can B. The upper end of the container is provided with a screw thread 2 to receive a cover member C and this cover member is provided with a central threaded stud forming an extension 3 which receives and secures a secondary or auxiliary cover member D. The secondary cover is provided with an interiorly threaded upwardly projecting hollow centrally arranged shell 3a receiving the threaded stud and engaging the threads thereof and forming a turning knob for rotating the secondary or auxiliary cover on the stud to cover and uncover the pouring and vent openings and to screw the auxiliary cover tightly against the main cover to seal the liquid dispensing device.

The main cover member C is provided with two openings indicated at 4 and 5, the opening 5 serving as a vent opening and the opening 4 as a pouring opening. These openings are adapted to be sealed by the secondary or auxiliary cover member D when the container is not in use by merely turning the auxiliary cover to the full line position shown in Fig. 2. On the other hand if the container is to be used and the liquid content of the can B is to be served the cover member D is turned to the dotted line position shown in Fig. 2 so as to uncover the pouring and venting openings.

The devices shown in Figs. 1 and 3 are substantially identical in construction; Fig. 1 showing the main container A threaded at the upper end to receive the cover member C, while Fig. 3 shows the cover member C and the main container formed as an integral structure with a thread at the lower end as shown at 6 to receive a removable bottom section 7. In Fig. 1 the removable cover member C is provided with a handle 8 which is entirely independent of the main container A. In Fig. 3 the handle is formed integral with the main container and the cover C. In Fig. 1 an elongated auxiliary cover member D is employed. In Figs. 3 and 4 the auxiliary cover member indicated at D' is substantially circular in shape but it is provided with two opposed notches or recesses such as shown at 9. By rotating the cover a quarter of a revolution in one direction or the other the pouring or venting openings may be covered or closed as desired.

In actual practice the device illustrated is particularly intended for receiving and dispensing condensed milk. The can B in which the milk is purchased is inserted in the main container, see Fig. 1, by unscrewing the cover section C. After the milk can is inserted the cover section is applied and the auxiliary cover D is turned to the dotted line position. The can top indicated at 10 is then punched through the openings 4 and 5 by a suitable implement as indicated at 4a and 5a and the contents of the can B may then be dispensed as desired. The screw connection 3 formed between the main cover and the auxiliary cover D is of considerable importance as it permits the auxiliary cover to snugly and tightly engage the top surface of the cover when turned to closed position as shown in Fig. 2. This manner of applying and securing the auxiliary cover provides a substantially perfect seal preventing air circulation and rapid souring of the milk content even though the weather may be fairly warm. It excludes dirt and dust and it positively prevents contamination by flies or other insects.

When the milk can has been completely drained the operation of removing the can and replacing it with a new one is simple as it is only necessary to unscrew the parts A and C to remove the empty can and to permit insertion of a new can. While the parts are separated if it is desired to clean them they may be dipped or washed in boiling water so as to insure sterilization and as only three parts are employed, to-wit, the main container A, the main cover C, and the auxiliary cover D, the operation of cleaning and sterilizing the same can be quickly and easily accomplished. With the parts cleaned and sterilized a new can may be inserted and the parts assembled as previously described. The auxiliary cover D may be completely removed at any time when thorough cleaning is desired.

What has been said of the structure shown in Fig. 1 is also true of the structure shown in Fig. 3. By again referring to Fig. 1, it will be noted that the inner end of the pouring opening 4 is surrounded by a flange 11 which projects a slight distance below the inner surface of the main cover C. This is of considerable importance as it has been found that the upper surface of milk cans is usually slightly depressed. By extending or providing the annular flange 11 contact is made between the pouring opening and the perforated portion of the can thus preventing the milk from leaking or spreading out over the top surface of the can when the content is being poured. A similar contact may be made between the main cover and the venting opening but as the milk has no tendency to escape through the venting opening such construction may be optional.

In Fig. 5 the main cover section C is formed integral with the container as in Fig. 3. The pouring and venting openings are however enlarged as shown by dotted lines in Fig. 5 and the cover is furthermore provided with an annular downwardly projecting flange 12 which engages the upper surface of the can throughout its circumference, thus making tight engagement therewith. This flange is extended crosswise of the cover as shown by the dotted lines at 13 and the pouring opening is thus completely sealed from the venting opening and vice versa. The auxiliary cover employed is preferably connected by the screw extension 3 and as it is circular in shape as shown in Fig. 6 it must be completely unscrewed and removed when the content of the can is to be served. If the container with the can inside thereof is to be set aside for future use the screw cover is again applied and tightened, thus sealing the content and protecting it against dust, dirt and contamination.

Figure 8:
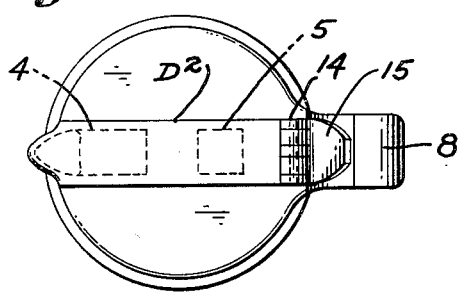
Fig. 8 is a plan view of Fig. 7.

In Fig. 7 another modified form is shown in which the main cover is formed integral with the container and the container is provided with a detachable bottom through means of the threaded connection similar to that shown in Fig. 3, hence the only difference between Figs. 7 and 3 is the construction of the auxiliary cover indicated at $D^2$. In Fig. 7, the auxiliary cover is pivotally attached to the main cover as at 14 and may be opened by pressure on a thumb extension 15. A plan view of the auxiliary cover $D^2$ is clearly shown in Fig. 8.

Figure 9:
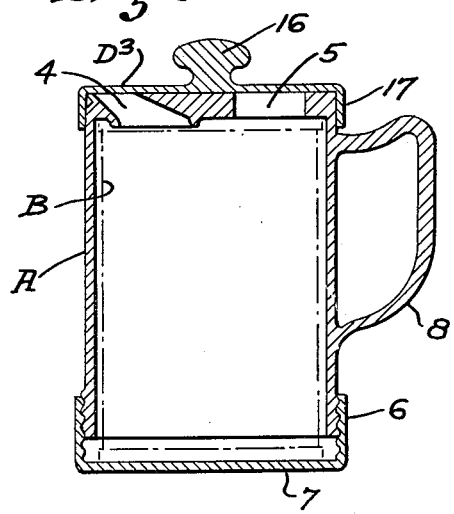
Fig. 9 is a section similar to Fig. 1 showing a modified form of secondary cover.
Figure 10:
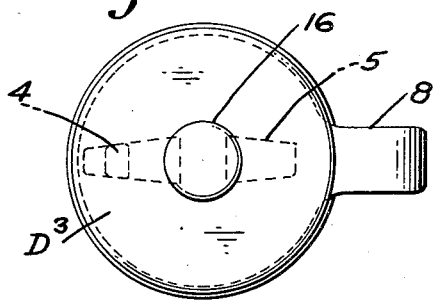
Fig. 10 is a plan view of Fig. 9.

The structure shown in Fig. 9 is substantially identical to that shown in Fig. 7, the only difference being that the auxiliary cover indicated at $D^3$ is provided with a knob 16 which permits it to be lifted off the main cover. To insure as tight a fit as possible and to prevent accidental displacement of the auxiliary cover an annular flange 17 is provided. Another slight difference is the shape of the pouring and venting openings shown in Figs. 9 and 10. That is, they are more elongated than the formation shown in Figs. 2 and 4. With the structure shown in Fig. 9 the auxiliary cover $D^3$ is removed when the container is placed on the table and is then replaced when the container is put aside for future use.

Figure 11:
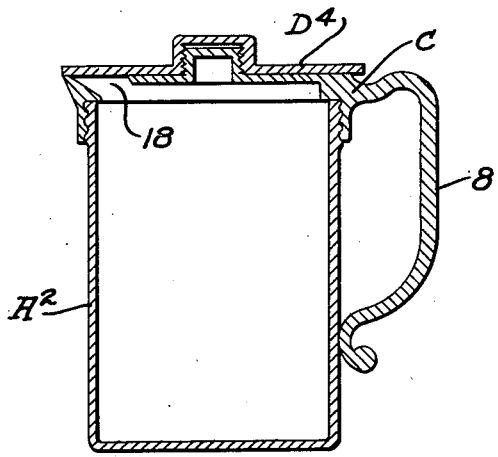
Fig. 11 is a section similar to Fig. 1, showing a modified form of the container to the extent that a single pouring opening functions both as a pouring and as a vent opening.
Figure 12:
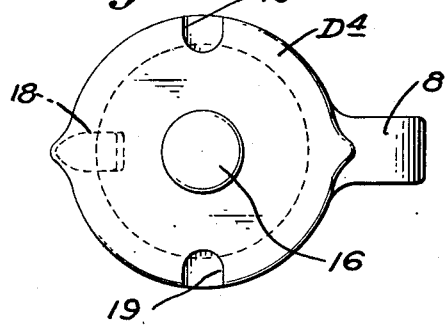
Fig. 12 is a plan view of Fig. 11.

In Fig. 11 a container is shown which is particularly intended for ordinary household use, for instance, for serving milk, cream, or the like, as received from the creameries. The contents of a milk bottle, for instance, is poured into the main container indicated at $A^2$ by removing the main cover section. After the milk has been poured into the container the main cover section is applied. A single opening is formed on the main cover section as shown at 18. This opening serves both as a pouring opening and as a venting opening and it may be closed by an ordinary screw cover $D^4$. The main cover is recessed at its inner face to extend or enlarge the inner end of the pouring opening to provide venting means. This may be notched in opposite sides as shown at 19 so that by turning it a quarter of a turn the combined pouring and venting opening is uncovered and just as readily closed.

The type of container shown in Fig. 11 is also practical for use without a can, and has proven very desirable as a single comparatively small opening is formed in the top which aids in keeping the contents from souring and further prevents entrance of crumbs and other foreign matter. This type of container is also advantageous in case of upsetting as a comparatively small amount will be spilled when comparison is made with an ordinary cream pitcher and if the lid is screwed on there is no danger even though children should upset the container as such upsetting could take place without any loss of the contents. This of course is also true of the containers which are provided with two openings.

The several containers of the two opening type are also adaptable for use where the contents of a can is poured therein or where ordinary milk or cream is used as it provides an almost complete air-proof receptacle.

In actual practice it has been found that the milk cans provided by different manufacturers may vary slightly in length. Such variation is taken care of by the container shown in this application as the screw threaded connection permits snug engagement of the can top regardless of slight variations in length or size.

It should be noted that the several structures disclosed are all exceedingly simple in construction. No more than three parts are required in any instance and as these parts are easily and quickly separated thorough cleaning and sterilization may be resorted to as often as desired. The containers may be constructed of any suitable material whether it be metal, bakelite, or otherwise, and as such may be made artistically so as to give any ornamental and color effect desired. Suffice it to say, that whether ordinary milk or cream is being served or hermetically canned milk is being served, such milk is maintained in the most sanitary condition possible as the content is substantially sealed against air thus improving the keeping qualities of the content. The content is covered against the entrance of dust and dirt and above all is protected against contamination by flies and other insects.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A liquid dispensing device comprising a container composed of separable sections having a threaded connection to afford access to the interior of the container, said container including a main cover having a pouring opening and a vent opening and provided with an exteriorly projecting threaded pivot stud, and an auxiliary cover arranged on the main cover and provided with an interiorly threaded upwardly projecting shell receiving the threaded pivot stud and engaging the threads thereof and forming a turning knob to enable the auxiliary cover to be rotated on the pivot stud to cover and uncover the said openings and to screw the auxiliary cover tightly against the main cover to seal the dispensing device.

2. A liquid dispensing device comprising a body member exteriorly threaded at its upper edge, a main cover having an interiorly threaded annular flange fitted on the body member and engaging the threads thereof, said main cover having a pouring opening and venting means and provided with an exteriorly projecting threaded pivot stud, and an auxiliary cover arranged on the main cover and provided with an interiorly threaded upwardly projecting shell receiving the pivot stud and engaging the threads thereof and forming a turning knob to enable the auxiliary cover to be rotated on the pivot stud to cover and uncover said opening and to screw the auxiliary cover tightly against the main cover to seal the dispensing device.

3. A liquid dispensing device comprising a container including a main cover having a pouring opening and a vent opening and provided with an exteriorly projecting threaded pivot stud, and an auxiliary cover arranged on the main cover and provided with an interiorly threaded upwardly projecting shell receiving the threaded pivot stud and engaging the threads thereof and forming a turning knob to enable the auxiliary cover to be rotated on the pivot stud to cover and uncover the said openings and to screw the auxiliary cover tightly against the main cover to seal the dispensing device.

LILLIAN S. WITHERSPOON.